US006701300B1

(12) United States Patent
Murakami et al.

(10) Patent No.: US 6,701,300 B1
(45) Date of Patent: *Mar. 2, 2004

(54) VEHICLE ALLOCATION SYSTEM

(75) Inventors: Hiroshi Murakami, Saitama (JP); Shunji Yano, Saitama (JP); Yuji Uehara, Saitama (JP); Kazuhiro Nakamura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/422,849

(22) Filed: Oct. 22, 1999

(30) Foreign Application Priority Data

Oct. 22, 1998 (JP) .......................................... 10-300237

(51) Int. Cl.[7] .............................................. G06F 17/60
(52) U.S. Cl. ............................. 705/10; 705/13; 701/117
(58) Field of Search ....................... 705/10, 13; 701/117

(56) References Cited

U.S. PATENT DOCUMENTS

| | | | | |
|---|---|---|---|---|
| 4,023,753 A | * | 5/1977 | Dobler .................... | 246/122 R |
| 4,360,875 A | * | 11/1982 | Behnke ................... | 379/93.18 |
| 4,411,338 A | * | 10/1983 | Kuzunuki et al. ....... | 182/180.1 |
| 4,799,162 A | * | 1/1989 | Shinkawa et al. ......... | 340/910 |
| 5,122,959 A | * | 6/1992 | Nathanson et al. ........ | 340/993 |
| 5,168,451 A | * | 12/1992 | Bolger ....................... | 701/117 |
| 5,289,369 A | * | 2/1994 | Hirshberg ............... | 235/382.5 |
| 5,297,049 A | * | 3/1994 | Gurmu et al. .............. | 340/989 |
| 5,493,694 A | * | 2/1996 | Vlcek et al. ................ | 455/521 |
| 5,726,885 A | * | 3/1998 | Klein et al. ................. | 455/456 |
| 5,812,070 A | * | 9/1998 | Tagami et al. ........... | 340/932.2 |
| 5,945,919 A | * | 8/1999 | Trask ......................... | 340/438 |
| 6,317,720 B1 | * | 11/2001 | Murakami et al. ............ | 705/10 |
| 6,430,496 B1 | * | 8/2002 | Smith et al. ................. | 701/117 |

FOREIGN PATENT DOCUMENTS

| | | | |
|---|---|---|---|
| EP | 05098776 A2 | 10/1992 | |
| JP | A9-153098 | 6/1997 | |
| JP | 09153098 A | * 6/1997 | .......... G06F/17/60 |
| WO | 98/20309 | 5/1998 | |

OTHER PUBLICATIONS

Patent Abstracts of Japan; Publication No. 09 153098; Publication Date: Jun. 10, 1997—Abstract only.
Patent Abstracts of Japan; Publication No. 09 152914; Publication Date: Jun. 10, 1997—Abstract only.

* cited by examiner

*Primary Examiner*—Tariq R. Hafiz
*Assistant Examiner*—C. Michelle Colón
(74) *Attorney, Agent, or Firm*—Birch, Stewart, Kolasch & Birch, LLP

(57) ABSTRACT

In relocating vehicles to a port running short of vehicles from another port, the seriousness of shortage is considered. A first computing section computes the number of expected demands. A second computing section computes the number of expected vehicles. An excess/shortage count computing section computes excess or shortage from the difference between the number of demands and the number of vehicles. An evaluation value computing section computes an evaluation value indicative of the degree of seriousness of vehicle shortage. A vehicle relocation setting section sets relocation by considering the evaluation value, namely the degree of seriousness of vehicle shortage.

16 Claims, 12 Drawing Sheets

| PORT | P1 | P2 | P3 | P4 | P5 |
|---|---|---|---|---|---|
| P1 |  | 5 MIN. | 15 MIN. | 20 MIN. | 30 MIN. |
| P2 | 5 MIN. |  | 7 MIN. | 15 MIN. | 20 MIN. |
| P3 | 15 MIN. | 7 MIN. |  | 9 MIN. | 20 MIN. |
| P4 | 20 MIN. | 15 MIN. | 9 MIN. |  | 10 MIN. |
| P5 | 30 MIN. | 20 MIN. | 20 MIN. | 10 MIN. |  |

Fig. 6

| PORT | P1 | P2 | P3 | P4 | P5 |
|---|---|---|---|---|---|
| P1 |  | 5.07 | 6.75 | 8.61 | 10.50 |
| P2 | 5.07 |  | 5.71 | 7.65 | 9.49 |
| P3 | 6.75 | 5.71 |  | 2.70 | 4.51 |
| P4 | 7.14 | 7.14 | 2.16 |  | 5.07 |
| P5 | 11.62 | 10.56 | 5.48 | 3.47 |  |

Fig. 9(a)

| PORT | P1 | P2 | P3 | P4 | P5 |
|---|---|---|---|---|---|
| P1 |  | 10.2 | 16.2 | 18.6 | 25.2 |
| P2 | 10.2 |  | 13.2 | 15.6 | 22.2 |
| P3 | 16.2 | 13.2 |  | 3.0 | 9.6 |
| P4 | 18.0 | 15.0 | 2.4 |  | 10.8 |
| P5 | 25.8 | 22.8 | 10.2 | 7.8 |  |

Fig. 9(b)

| PORT | P1 | P2 | P3 | P4 | P5 |
|---|---|---|---|---|---|
| P1 |  | 15 | 5 | 5 | 5 |
| P2 |  |  | 15 | 5 | 5 |
| P3 |  |  |  | 15 | 15 |
| P4 |  |  |  |  | 15 |
| P5 |  |  |  |  |  |

VEHICLE ALLOCATION SYSTEM

BACKGROUND OF THE INVENTION

1. Field of the Invention

The present invention relates generally to a vehicle allocation system; more particularly, to a vehicle allocation system capable of supplying (or allocating) vehicles with stability within a desired wait time set in the system according to a ride demand in each port inside a certain area including a plurality of ports.

2. Description of Background Art

In a vehicle allocation system for allocating a predetermined number of vehicles deployed in a certain area according to ride demands occurring in a plurality of ports, there may occur a shortage of currently available vehicles in any of the ports relative to the ride demand occurring in that port. If the shortage occurs, excess vehicles in other ports may be allocated to the shortage port (this is hereafter referred to as "vehicle relocation").

The above-mentioned vehicle allocation system is a reactive system in which measures are taken to relocate vehicles only after the occurrence of the vehicle shortage, thus taking time for relocation from other ports to the port concerned. In addition, additional ride demands may occur during vehicle relocation, and arrival of vehicles that departed from other ports before vehicle relocation may cause a new vehicle shortage or excess at each port, thereby failing to meet stability ride demands within a desired wait time.

To solve the above-mentioned problems inherent to the conventional vehicle allocation system, vehicle relocation may be performed based upon forecast data about ride demands. For example, vehicle allocation may be implemented according to the number of currently owned vehicles in each port and the current ride demand forecast occurring in that port, and the past ride demand statistical data. An example of such a vehicle allocation system is disclosed in Japanese Patent Laid-open No. Hei 9-153098.

In the above-mentioned conventional vehicle demand forecasting system, the number of currently available vehicles in each area is compared in absolute value with the demand to determine excess or shortage of vehicles. However, even if the number of vehicles in shortage is equal between ports, the degree of urgency in the number of vehicles to be allocated may differ from one port to another depending on the number of currently owned vehicles in each port. For example, assume that one port has 90 currently owned vehicles and 100 ride demands, resulting in a shortage of 10 vehicles, and another port has 10 currently owned vehicles and 20 ride demands, resulting in a shortage of 10 vehicles. The latter obviously has a higher urgency than the former.

Conventionally, relocation based on the number of vehicles in shortage relative to the currently owned vehicles is not executed; therefore, the proper vehicle allocation based on the degree of urgency in the number of vehicles cannot be provided satisfactorily.

SUMMARY OF THE INVENTION

It is therefore an object of the present invention to provide a vehicle allocation system which is based upon a degree of urgency in the number of vehicles in each port, thereby meeting actual ride demands more properly than the conventional system.

This and other objects of the present invention are accomplished by providing a vehicle allocation system including a vehicle count detecting means for detecting the number of vehicles in excess or shortage that is estimated within a scheduled time period for each of a plurality of ports set in an area; an evaluation value computing means for computing an evaluation value of a degree of vehicle excess or shortage considering a ride demand expected within said scheduled time period relative to the number of vehicles excess or shortage for each of said plurality of ports; and a relocation setting means for relocating an excess vehicle to the port having a lowest evaluation value from another port.

One or more the objects of the present invention are accomplished by a vehicle allocation system comprising means for detecting a forecast occurrence ride demand count for each port by adding a forecast ride demand count expected to occur within a scheduled time period to a currently owned ride demand count; means for detecting a forecast occurrence vehicle count for each port by adding an arrival vehicle count expected to arrive within the scheduled time period to a currently owned vehicle count; means for computing a vehicle excess or shortage count for each port on the basis of the forecast occurrence ride demand count and the forecast occurrence vehicle count; and means for computing an evaluation value of the degree of urgency of the number of vehicles on the basis of the forecast occurrence ride demand count relative to the vehicle excess or shortage count; wherein an excess vehicle is relocated to the port having a lowest evaluation value from another port.

One or more the objects of the present invention are also accomplished by a method of allocating vehicles, comprising the steps of determining a forecast occurrence ride demand count for each of a plurality of delimited areas by adding a forecast ride demand count expected to occur within a scheduled time period to a currently owned ride demand count; determining a forecast occurrence vehicle count for each of the plurality of delimited areas by adding an arrival vehicle count expected to arrive within the scheduled time period to a currently owned vehicle count; determining an evaluation value based upon the forecast occurrence ride demand and the forecast occurrence vehicle count for each of the plurality of delimited areas; arranging the evaluation value for each of the plurality of delimited areas in increasing order; determining an excess or shortage of vehicles for each of the plurality of delimited areas in the order arranged in the arranging step; calculating the difference of the forecast occurrence vehicle count and the forecast occurrence ride demand count for each of the plurality of delimited areas; and determining if any of the plurality of delimited areas needs relocation of at least one vehicle based upon a polarity of the difference calculated in the calculating step.

The method and system of the present invention may alternatively include terminating vehicle allocation control if the polarity is positive for each of the plurality of delimited areas; and relocating at least one vehicle to at least one of the plurality of delimited areas if at least one of the plurality of delimited areas has a negative polarity. In addition, it is possible to incorporate updating the evaluation value once at least one vehicle is relocated by the relocating step and/or during the step of relocating, if one of the delimited areas has a negative polarity, relocating a vehicle from a delimited area having an excess of vehicles, and in closest proximity, to the delimited area having negative polarity.

The evaluation value can also be calculated by subtracting the forecast occurrence demand from the forecast occurrence vehicle count to obtain a first value, and dividing the first value by a root of the forecast occurrence demand count.

According to the present invention, the number of vehicles in excess or shortage is detected in each of an area. Based on the detection, excess vehicles are relocated from a port having excess vehicles to a port having vehicles fewer than the expected number of vehicles.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 is a diagram illustrating one example of vehicle travel times between ports;

FIGS. 9(a) to 9(c) are diagrams illustrating a result of simulations of vehicle travel time between ports;

DETAILED DESCRIPTION OF THE PREFERRED EMBODIMENTS

Figure 1:
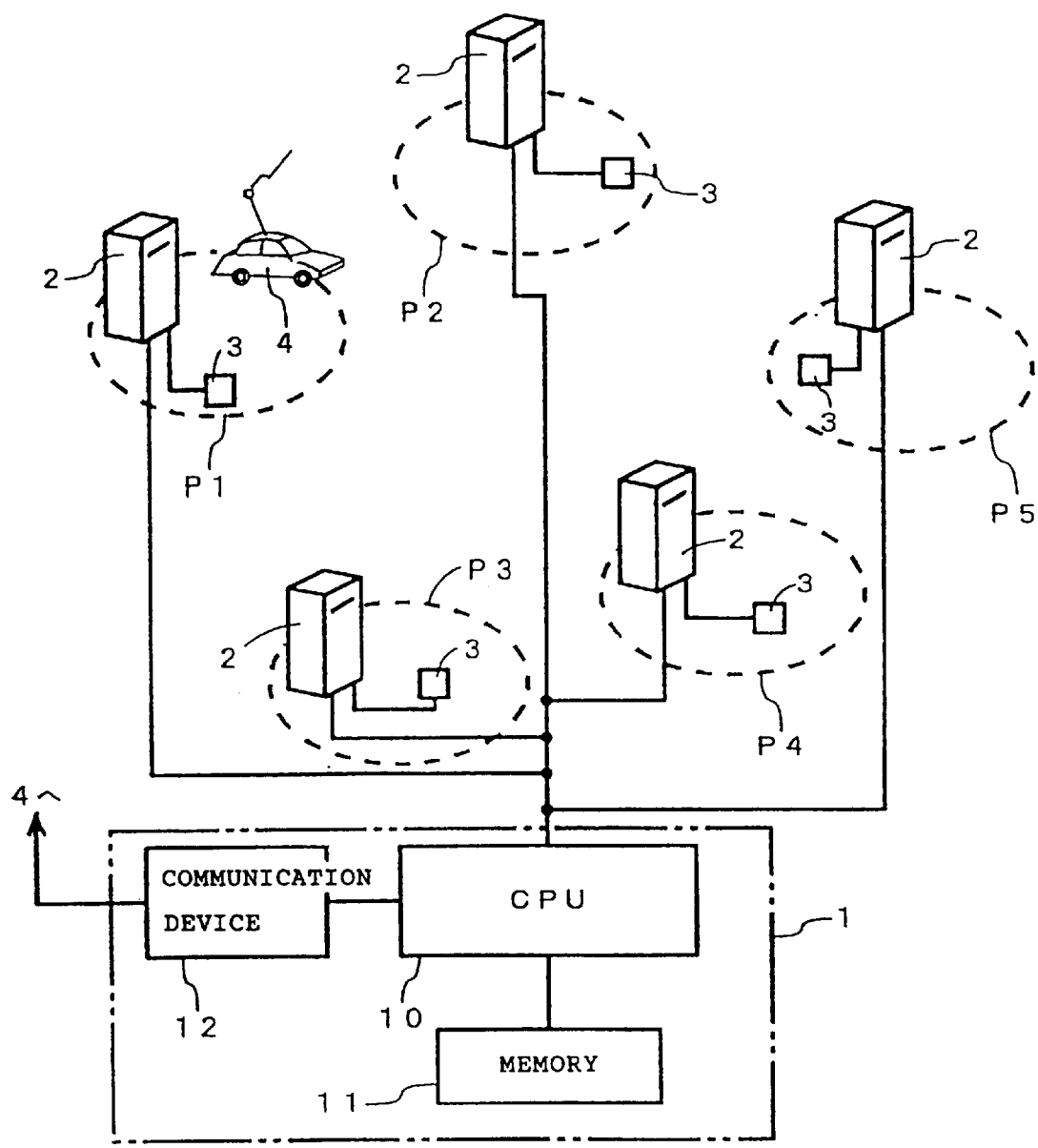
FIG. 1 is a schematic diagram illustrating a vehicle allocation system practiced as one preferred embodiment of the present invention.

FIG. 1 illustrates a vehicle allocation system practiced as one preferred embodiment of the present invention. Ports P1, P2, P3, P4, and P5 (hereafter generically referred to as port P unless specific ports are referenced) are predetermined parking spaces arranged in i.e., a golf course, an airport, or a hotel. In this area, a plurality of vehicles 4 are deployed. The optimum number of vehicles to be deployed in the area will be described later. Port P has a terminal 2 which is connected to a sensor 3 for detecting vehicles coming and going.

The sensor 3 has a capability of identifying vehicle numbers in order to identify the vehicle 4. The vehicle number herein may be a number written on the front or/and rear license plate of each vehicle or one that is written on a special portion of a vehicle such as its side or top. The vehicle numbers are not limited to numeric characters. They may be identification information such as bar-codes and other codes. The sensor 3 may be an optical sensor for optically reading the vehicle number on each vehicle.

The terminal 2 has an identification device (not shown) for identifying a user of that vehicle. This identification device checks the ID number or the like of the user whether the user is a registered contract user or not. Preferably, the ID number or the like is written on an IC card. The identification device reads the IC card presented by the user at the beginning of use and at the end of use to identify the end of vehicle usage. The terminal 2 has an input device (not shown) for the user to input a destination. This input device may be constituted by the switches corresponding to the ports P1 through P5.

The vehicle 4 is a self-propelled electric car for example, which is constituted such that the door lock is cleared for starting when the user is permitted to use the car. It should be noted that the door lock may be cleared by the above-mentioned IC card of the user. In any case, it is preferable that the identification information (ID number or the like) for identifying the user having the IC card is identified by the terminal 2 of the port P in which the user rides the vehicle.

The terminal 2 is connected to a host computer 1 (hereafter referred to as a "host") through a communication line. Data transfer is executed between the terminal 2 and the host 1. The terminal 2 in the port P in which the user rides the vehicle sends the currently owned vehicle numbers in port P, the number of such vehicles in port P, the contract user ID numbers in port P, the ride demands, and so on to the host 1. A ride demand occurs when the user inputs the ID number. The ride demand includes the information about destination. The host 1 references the personal information of the contract user based on the ID number to determine whether the use of the vehicle is permitted or not, then instructing the terminal 2 for the permission of vehicle lending and the vehicle to be lent. This instruction actually allows the ride in the vehicle. When this instruction is made, "occurrence trip" occurs.

On the other hand, the terminal 2 of port P in which the vehicle carrying the user arrives sends the currently owned vehicle numbers in the port P, the number of such vehicles in port P, the contract user ID number, the arrival recognition information, the contract user travel data, and so on to the host 1. The arrival recognition information is outputted, on the basis of the detection result of the sensor 3, when the vehicle 4 corresponding to the occurrence trip has entered port P.

The host 1 has a computing means (CPU) 10 for performing the computation for instructing, on the basis of the information supplied from the terminal 2, the terminal 2 for lending permission and a vehicle to be lent, a storage device (memory) 11, and a communication device 12 for giving instructions to each vehicle 4. The memory 11 stores forecast ride demand data (hereafter referred to as "forecast occurrence trip") of each port P as one of the ride demand statistical data of all ports. The memory also stores data such as contract user information and contract user travel data. The forecast occurrence trip denotes a prospective demand per day set on the basis of past demand results. The contract user information is personal information such as the name of contract user corresponding to the ID number. The contract user travel data includes travel distance and travel time for use in billing the contract user.

Figure 2:
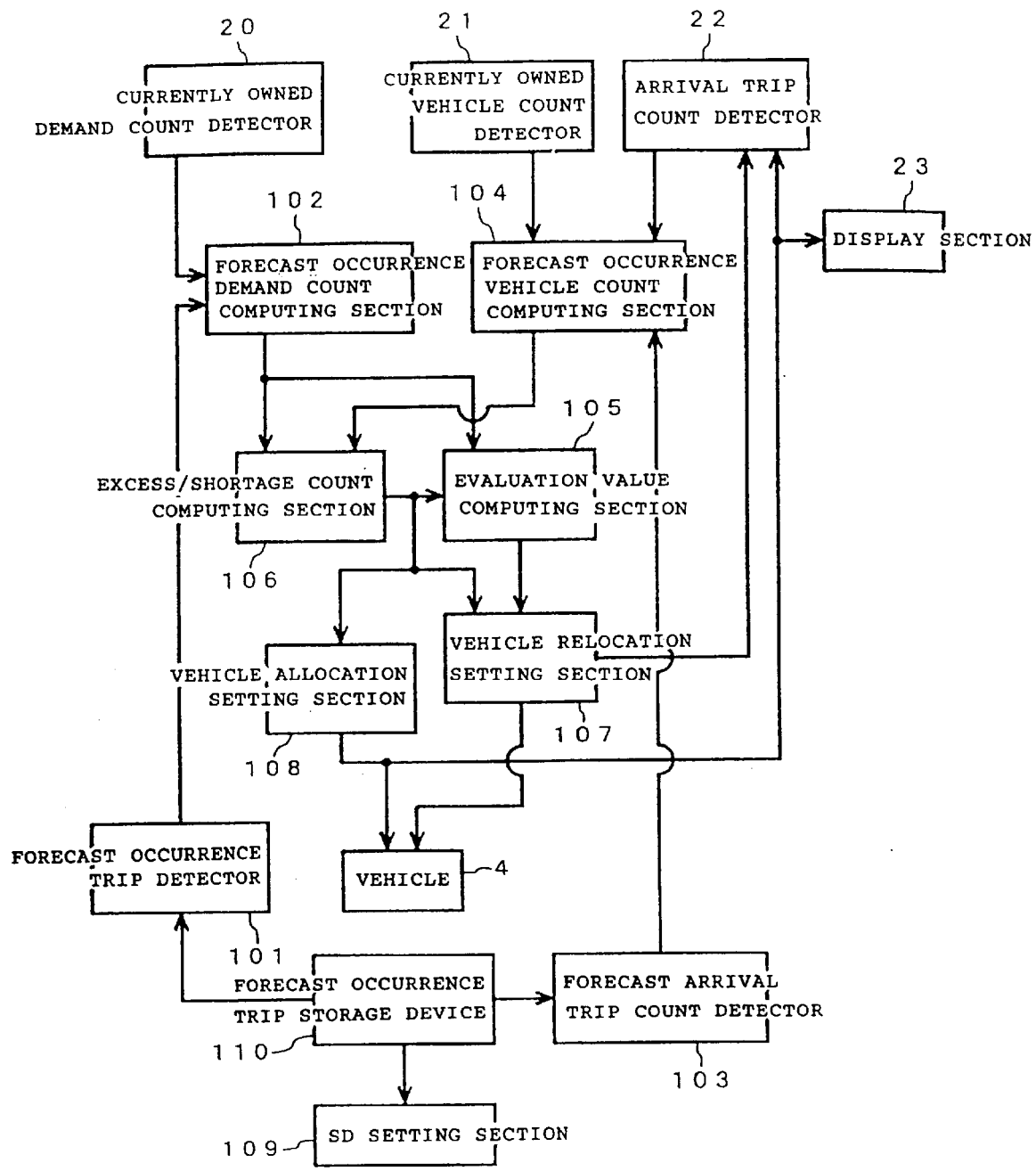
FIG. 2 is a block diagram illustrating main capabilities of a host computer and a terminal which are set at a port.

FIG. 2 is a block diagram illustrating main capabilities of the host 1 and the terminal 2 for setting vehicle allocation and relocation. The terminal 2 has a currently owned demand count detector 20, a currently owned vehicle count detector 21, an arrival trip count detector 22, and a display section 23. On the basis of a demand detection signal caused when the ID number inputted by the user is recognized, the currently owned demand count detector 20, detects the number of demands actually occurring in that port P. On the basis of the vehicle number detected by the sensor 3 and the detection result of vehicle comings and goings, the currently owned vehicle count detector 21 detects the number of currently available vehicles in that port P. The arrival trip count detector 22 detects the occurrence trip that actually occurred in another port P and the number of vehicles (arrival trips) that are expected to surely arrive by relocation. The arrival trip includes both a vehicle within a search range (SD) or a scheduled time period (to be described later) and a vehicle deployed by relocation during the SD time.

The display section 23 is for instructing or guiding the user for the vehicle to ride in. On the basis of the lending permission or the like inputted from the host 1, guidance is executed in image or voice. If the vehicle 4 is available in port P and a ride vehicle instruction can be issued immediately after inputting of the ID number of the user, the display section 23 may execute guidance of the vehicle number and the like and, if the vehicle 4 is unavailable, the display section 23 may execute guidance of the forecast wait time. The currently owned demand count detector 20, the currently owned vehicle count detector 21, the arrival trip count detector 22, and the display section 23 may be provided as capabilities of the terminal 2. Except for the display section 23, these detectors may be capabilities to be executed by the host 1 side on the basis of the information supplied from the terminal 2.

On the other hand, the memory 11 of the host 1 is provided with a forecast occurrence trip storage device section 110. The forecast occurrence trip storage section 110 stores a ride demand result of one day in the form of time-series data as a forecast occurrence trip (forecast ride demand) for each port P. The forecast occurrence trip is an accumulation of the past ride demand results classified by weather, time and date, and day of the week, for example. Preferably, the forecast occurrence trip according to time and date, weather, or day of the week, for example, may be supplied to the CPU 10 in advance. The forecast occurrence trip is read by a forecast occurrence trip count detector 101 to be supplied to a forecast occurrence demand count computing section 102. The forecast occurrence demand computing section 102 adds the above-mentioned the currently owned demand count to the forecast occurrence trip count to compute a forecast occurrence demand count.

The forecast arrival trip count detector 103 detects a forecast arrival trip count on the basis of the above-mentioned forecast occurrence trip and inputs the detection into a forecast occurrence vehicle count computing section 104. The forecast occurrence vehicle count computing section 104 adds the forecast arrival trip count and the arrival trip count to the number of currently owned vehicles to compute a forecast occurrence vehicle count. It should be noted that the forecast arrival trip count depends on the ratio of the number of currently owned vehicles (including the arrival trips within the SD time in this case) in that port P to the forecast occurrence demand count in port P in which an occurrence trip corresponding to the arrival trip has occurred. Namely, when this ratio is large, it indicates that there are excess vehicles, so that it is highly possible for the forecast arrival trip to become an actual arrival trip. When this ratio is low, it means there is no excess vehicles, so that the possibility of the forecast arrival trip becoming an actual arrival trip is low.

Therefore, a value obtained by multiplying a forecast arrival trip count by the above-mentioned ratio (referred to as a reduction coefficient) is used as a forecast arrival trip count, which is used for the calculation of a forecast occurrence vehicle count. Namely, the forecast occurrence vehicle count and the reduction coefficient are calculated by relations (f1) and (f2) as follows:

Forecast occurrence vehicle count=currently owned vehicle count+ (reduction coefficient × forecast arrival trip count)+arrival trip count　　　(f1)

Reduction coefficient=(currently owned vehicle count +arrival trip count)÷forecast occurrence demand count　　　(f2)

An evaluation value computing section 105 computes an evaluation value for determining the urgency of the number of vehicles in each port P by use of relation (f3) on the basis of a forecast occurrence demand count and a forecast occurrence vehicle count:

Evaluation value=(forecast occurrence vehicle count−forecast occurrence demand)÷forecast occurrence demand count$^{1/2}$　　　(f3)

It should be noted that the root of the forecast occurrence demand count is the denominator. This is because relocation setting processing (to be described later) can be executed as initially intended by largely varying the evaluation value according to the variation in the forecast occurrence demand count, namely by making the sensitivity high. Therefore, although a square root is used in relation (f3), a cubic root or other roots may be used as required. Obviously, as the multiplier increases, the sensitivity of the evaluation value increases.

An excess/shortage count computing section 106 computes the difference between a forecast occurrence demand count and a forecast occurrence vehicle count, namely the excess or shortage of vehicles. A vehicle relocation setting section 107, on the basis of the vehicle excess or shortage count of each port P and in consideration of the above-mentioned evaluation value, gives an instruction of relocation for moving the excess vehicle 4 to another port P. This vehicle relocation instruction is given to the vehicle 4 through the above mentioned communication device 12. In order to meet the relocation requirement, the vehicle 4 is equipped with a communication device and an automatic travel device. For the automatic travel system, a known system may be used such as a position sensing system using map data and GPS and a traffic light and obstacle monitor system.

If an available vehicle is found, a vehicle allocation setting section 108, immediately informs the terminal 2 of the lending permission and the vehicle to lend. If there is no available vehicle, the vehicle allocation setting section calculates a wait time on the basis of the arrival trip, the relocated vehicle arrival scheduled time, and so on, and informs the terminal 2 of the result. This allows the user to recognize the wait time.

It should be noted that an SD setting section 109 determines, on the basis of the data stored in a forecast occurrence trip storage device 110, whether the demand estimated to occur per scheduled time period is in excess of the number of scheduled reference vehicles. According to the result of the determination, the SD setting section 109 determines a search range (SD time), i.e., a time period which spans a prescheduled number of hours (or minutes), starting from the current time, in which to search for forecasted starting trips. The forecast occurrence demand count computing section 102 and the forecast occurrence vehicle count computing section 104 compute the number of demands and the number of vehicles in this SD time. An SD time determination algorithm will be described later.

Figure 3:
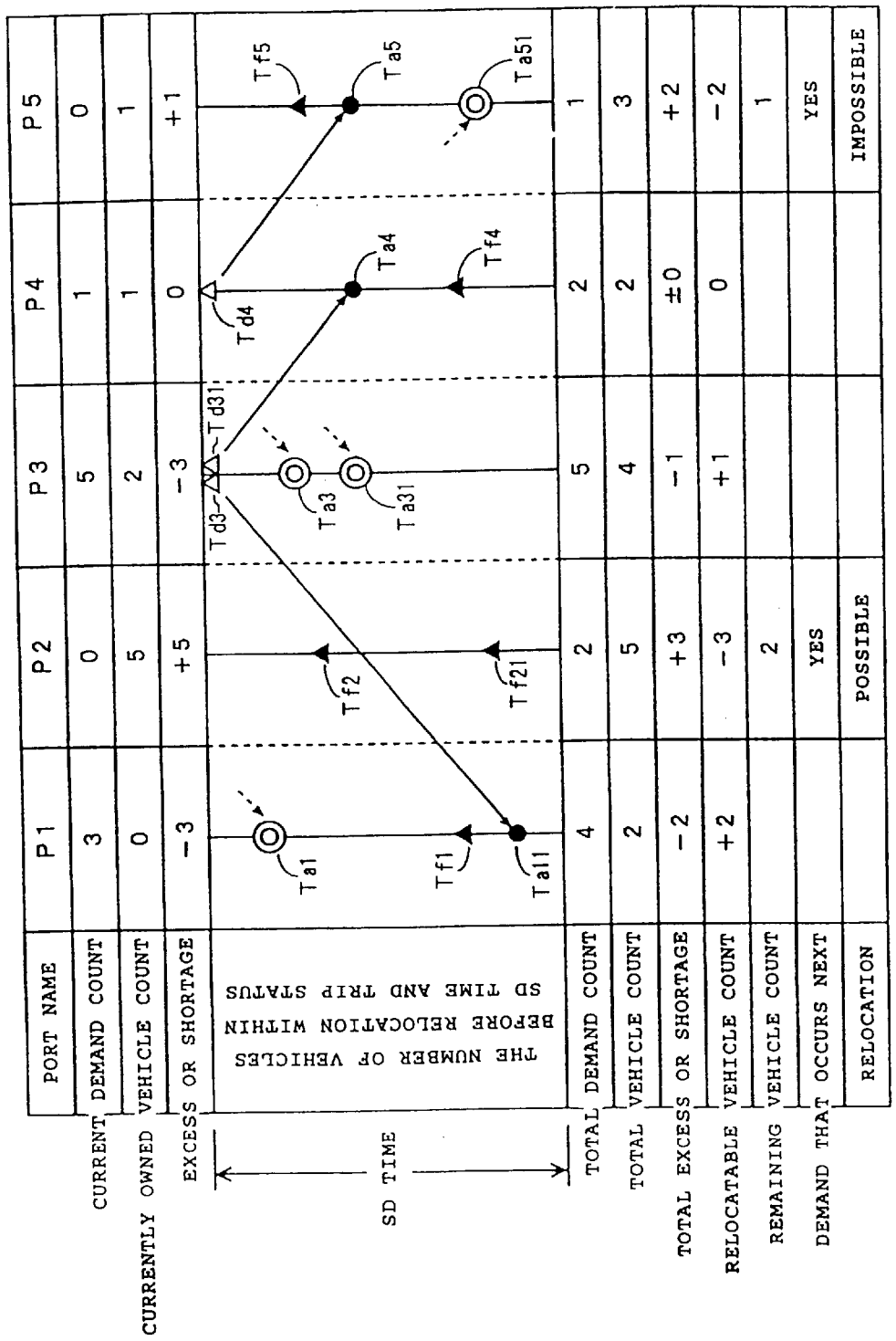
FIG. 3 is a diagram illustrating a ride demand and the number of vehicles of each port before a relocation instruction.

The following describes an actual example of vehicle allocation and vehicle relocation. If vehicle relocation is executed only on the basis of the currently owned vehicle count and currently owned demand count in each port P, no efficient vehicle allocation can be executed because of a new vehicle excess or shortage caused by demand fluctuation and vehicle movement. Therefore, in the present embodiment, in order to execute vehicle relocation, the vehicle excess or shortage is calculated by considering the forecast occurrence demand and the forecast occurrence vehicle count within a preset SD time. In this case, vehicle relocation is executed by using a reduction coefficient for increasing the accuracy of the forecast arrival trip count as mentioned above and considering an evaluation value representing the degree of urgency of the number of vehicles in each port P. FIG. 3 is a diagram illustrating variations in the number of vehicles caused by the occurrences of occurrence trips and arrival trips in each port P. In this diagram, the occurrence of trips predicted in the current SD time are estimated but the trips for vehicle relocation are not considered.

In the figure, the currently owned demand count is "3" and the currently owned vehicle count is "0" in port P1, indicating a shortage of three vehicles at this point of time. In port P1, there are arrival trip Ta1 due to the occurrence trip caused in another port before the current point of time and arrival trip Ta11 due to the initial occurrence trip Td3 and the current SD time caused in port P3. On the other hand, because the occurrence of forecast occurrence trip Tf1 is predicted, the total number of demands, namely the number of forecast demands is "4". Therefore, the number of demands is "4" relative to the number of available vehicles of "2" within the current SD time, resulting in a shortage of two vehicles.

In port P2, the currently owned demand count is "0" and the currently owned vehicle count is "5", so that five vehicles are in excess at the current point of time. In port P2, forecast occurrence trips Tf2 and Tf21 are predicted to occur, so that the total number of demands is 2. Therefore, the number of demands is "2" relative to the number of available vehicle of "5" in the current SD time, so that three vehicles are expected to be in excess.

In port P3, the currently owned demand count is "5" and the current owned vehicle count is "2", so that three vehicles are in shortage at the current point of time. In port 3, there are two currently owned vehicles, so that occurrence trips Td3 and Td31 immediately occur in response to the two demands. Also, there are arrival trips Ta3 and Ta31 due to occurrence trips that occurred in another port in a previous SD time. There is no forecast occurrence trip, so that the total number of demands remains "5". As a result, the number of demands is "5" relative to the number of available vehicles of "4" within the current SD time, indicating a shortage of one vehicle.

In port P4, the currently owned demand count is "1" and the currently owned vehicle count is "1", so that there is no excess or shortage of vehicles. In port P4, because there is one currently owned vehicle, occurrence trip Td4 occurs immediately in response to a demand. In port P4, forecast occurrence trip Tf4 is predicted, so that the total number of demands is "2". Also, arrival trip Ta4 due to the occurrence trip that occurred in port P3 is predicted. Therefore, the number of demands is "2" relative to the number of available vehicles of "2" within the current SD time, so that there is no excess or shortage of vehicles.

In port P5, the currently owned demand count is "0" and the currently owned vehicle count is "1", so that one vehicle is in excess at the current point of time. In port P5, there is arrival trip Ta5 due to occurrence trip Td4 in port P4 and there is arrival trip Ta51 due to the occurrence trip that occurred in another port in a previous SD time. Also, forecast occurrence trip Tf5 is predicted, so that the total number of demands is "1". As a result, the number of demands is "1" relative to the number of available vehicles in the current SD time of "3", so that there will be two excess vehicles.

Relocation is set on the basis of the fluctuation in the number of vehicles and demands within the above mentioned SD time. The following describes a vehicle relocation algorithm step by step. First, as a first stage, a vehicle relocatable port and the number of relocatable vehicles within a SD time are detected. In the above-mentioned example, port P2 and port P5 have excess vehicles, so that relocation can be made from these ports. As a second stage, in the vehicle relocatable ports, the number of vehicles remaining at these ports after relocation is calculated. As a third stage, it is determined whether these remaining vehicles can meet a demand that occurs next. Namely, if a demand occurs after all vehicles have been relocated and before the number of vehicles in that port P recovers due to arrival trip and so on, that demand cannot be satisfied immediately. Therefore, if the number of remaining vehicles is possibly available for the demand that occurs next, these vehicles are actually made relocatable. It should be noted that the vehicles to be relocated are sequentially set for ports P in increasing order of the calculated evaluation values. Here, it is determined whether relocation is to begin in increasing order of distances from the ports P having excess vehicles to the port P in shortage, or in decreasing order of the evaluation values of the ports P having excess vehicles.

In the above-mentioned example, if three excess vehicles are relocated from port P2, there remain two vehicles, so that there still remains one vehicle when forecast occurrence trip Tf2 that occurs next is satisfied. Therefore, port P2 can relocate three vehicles on the other hand, in port P5, when two excess vehicles are relocated, only one vehicle remains. Therefore, when forecast occurrence trip Tf5 that occurs next is satisfied with this one vehicles, there remains no vehicle, making relocation impossible.

If vehicle relocation is practicable in port P5, relocation becomes practicable from both port P2 and port P5. Therefore, relocation can be executed from ports 2 or port 5 whichever is nearer to port P1 and port P3 running short of vehicles.

Figure 4:
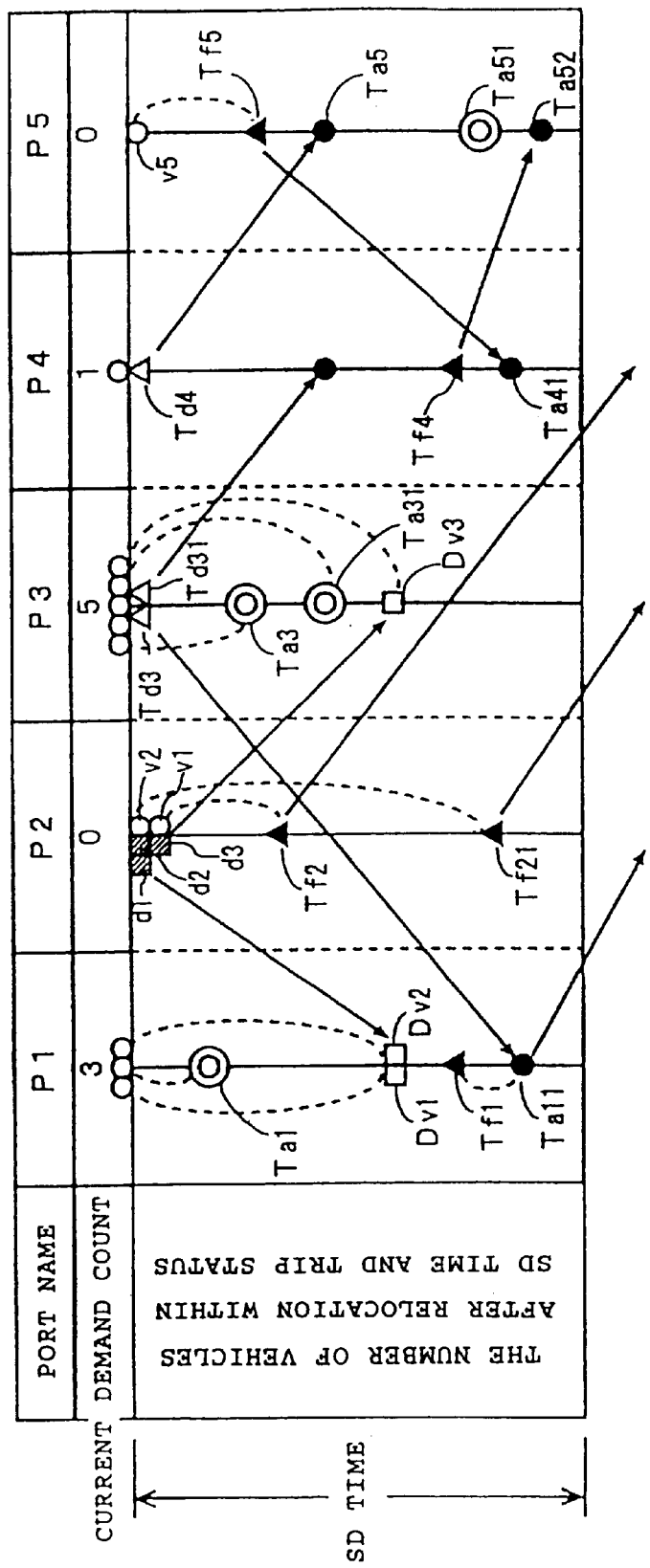
FIG. 4 is a diagram illustrating a ride demand and the number of vehicles in each port after a relocation instruction.

FIG. 4 is a diagram illustrating the variations in the number of vehicles in each port P within the SD time when relocation has been executed on the basis of the result of the abovementioned examination. In the figure, in port P1, one of the users of the current demands can ride on the vehicle of arrival trip Ta1 and second and third users can ride on two vehicles (Dv1 and Dv2) relocated from port P2. The user of forecast occurrence trip Tf1 can ride on the vehicle of arrival demand Ta11.

In port P2, two vehicles (d1 and d2) are relocated to port P1 and one vehicle (d3) relocated to port P3. The user of forecast occurrence trip Tf2 can ride on the currently owned vehicle (V1) and the user of forecast occurrence trip Tf21 can ride on the currently owned vehicle (V2).

In port P3, there are two currently owned vehicles, so that two of the five demands can be met immediately, thereby allowing two users to ride on the vehicles of occurrence trips Td3 and Td31. The third and fourth users can ride on the vehicles of arrival trips Ta3 and Ta31. The fifth user can ride on the vehicle (Dv3) relocated from port P2.

In port P4, there is one currently owned vehicle, so that one demand can be met immediately, thereby allowing the user to ride on the vehicle of occurrence trip Td4. Further, a user corresponding to forecast occurrence trip can ride the vehicle of arrival trip Ta4. In addition, in port P4, there is arrival trip Ta41, which is based on forecast occurrence trip Tf5 in port P5 and therefore unpredictable and not considered at the examination of relocation.

In port P5, there is one currently owned vehicle but no demand, so that no occurrence trip occurs immediately. The user of forecast occurrence trip Tf5 can ride currently owned vehicle (V5). The vehicles of arrival trips Ta5 and Ta51 that will occur thereafter remain unrelocated. In port P5, there is arrival trip Ta52 based on forecast occurrence trip Tf4 that occurred in port P4. This arrival trip is unpredictable and therefore not considered at the examination of relocation. However, based on statistical data, this arrival trip Ta52 may be considered into the calculation of relocation.

Thus, as a result, ports P1 through P3 can meet the demands within SD time without involving vehicle excess or shortage. In port P4, there remains one vehicle, while in port P5 there remain three vehicles.

In the above-mentioned example, the demands can be met within the current SD time. However, if some demands cannot be met within this SD time, the vehicle in shortage are remained till the examination of relocation in the next SD time. In the case where a maximum wait time is preset and this preset maximum wait time is exceeded within this current SD time, the relocatable vehicles including ones in the ports P previously determined for no vehicle relocation are relocated to meet the demands.

Figure 5:
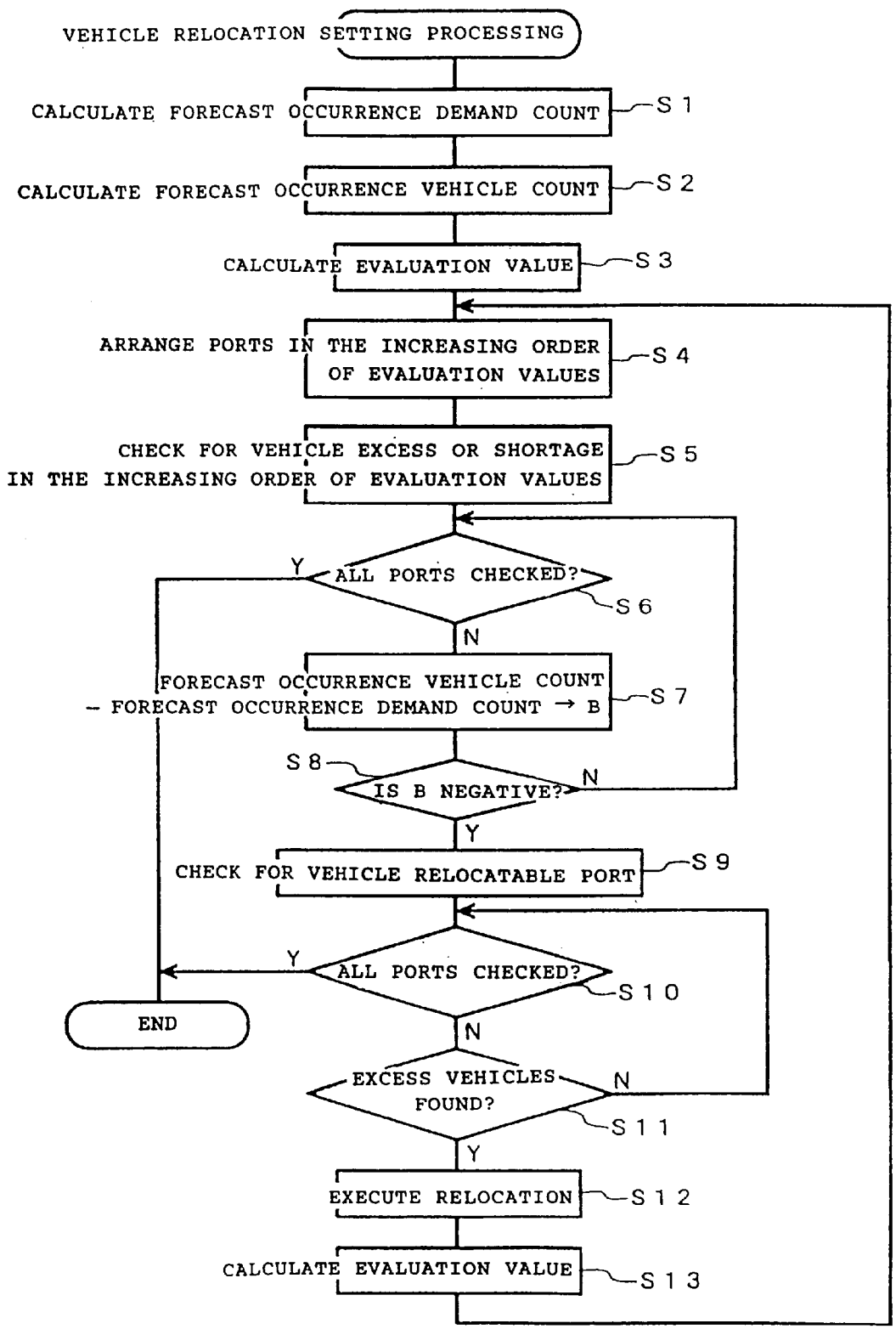
FIG. 5 is a flowchart indicative of relocation setting processing.

The following describes the processing of the above-mentioned vehicle relocation with reference to a flowchart. FIG. 5 is the flowchart indicative of the processing of vehicle relocation setting. In step S1, the number of forecast occurrence demands is calculated. In step S2, the number of forecast occurrence vehicles is calculated. In step S3, an evaluation value is calculated from the number of forecast occurrence demands and the number of forecast occurrence vehicles by use of the above-mentioned relation (f1) When processing operations of steps S1 through S3 have been performed on all ports P, then, the processing goes to step S4.

In step S4, the ports P are arranged in the increasing order of evaluation values. In step S5, the ports P are checked for vehicle excess or shortage in the increasing order of evaluation values. In step S6, it is determined whether all ports P have been checked. If the decision is "no", then the processing goes to step S7. In step S7, the number of forecast occurrence demands is subtracted from the number of forecast occurrence vehicles of that port P and the result is set to variable B. In step S8, it is determined whether variable B is negative or positive, thereby determining whether port P concerned is running short of vehicles.

If any port P running short of vehicles is found, then the step goes to step S9 in which the vehicle relocatable ports P are checked in the increasing order of distances from the port P running short of vehicles. In step S10, it is determined whether all ports P have been checked. If the decision is "no", the processing goes to step S11. In step S11, it is determined whether port P concerned is currently in excess of vehicles. The excess of vehicles here denotes that there is currently an excess vehicle and the number of currently owned vehicles is greater than the number of forecast occurrence demands. This condition is provided to meet a situation in which, when excess vehicles have been relocated and there still remain vehicles, thereby satisfying a demand that occurs next.

If the decision in step S11 is "yes", then the processing goes to step S12, in which relocation is executed. In step S13, an evaluation value is calculated from both the number of forecast occurrence demands and the number of forecast occurrence vehicles after the relocation made in step S12. When the evaluation value is obtained, the processing goes back to step S4 to repeat the above-mentioned processing operations.

If no port P is found not running short of vehicles, namely, if the decision of step S6 is "yes", no relocation is required, upon which this processing comes to the end. If, for all ports P, there are not enough vehicles for relocation, namely if the decision of step S10 is "yes", no relocation can be performed, upon which this processing comes to the end.

As described, in the present embodiment, relocation is executed from the ports P in the order of more serious vehicle shortage determined on the basis of the obtained evaluation value. And the evaluation value is updated every time one session of relocation has been executed, thereby dynamically meeting the vehicle excess or shortage that may fluctuate from one session of relation to another.

In the above-mentioned flowchart, for the detection of vehicle relocatable ports, the ports are checked in the increasing order of their locations from port P running short of vehicles. This check may also be performed in the decreasing order of the evaluation values of the ports P. This can prevent a situation in which a specific port is outstandingly in excess of vehicles, thereby maintaining a situation in which vehicles are deployed equally all over ports P.

The following describes an algorithm for setting the SD time. FIG. 6 is a diagram illustrating times required for vehicle relocations among ports. As shown, the required time between farthest ports is 30 minutes while the required time between nearest ports is 5 minutes. These times are illustrative in manner and may vary based upon the number of ports and their respective distances between each other. As seen from the figure, if the number of vehicles relocatable within an SD time of less than 5 minutes is determined, the vehicles relocated in that SD time will not arrive at a schedule port. Within an SD time of 5 minutes to less than 7 minutes, relocation can be made only between port P1 and port P2. Within an SD time of 7 minutes to less than 9 minutes, relocation can be made only between port P1 and port P2 and between port P2 and port P3. Likewise, further examination indicates that relocation can be made between all ports within an SD time of 30 minutes or longer. Thus, to make relocation practicable, an SD time over the minimum required time for each travelling port P-to-port P must be set. In the example shown in FIG. 6, this SD time is 5 minutes or longer.

In terms of a maximum wait time, an SD time which is shorter than a maximum wait time must be set. For example, if a maximum wait time is 15 minutes, an SD time must be set to less than 15 minutes. In this case, vehicle relocation can be made between port P1 and port P2, between port P2 and port P3, between port P3 and port P4, and between port P4 and port P5. If the vehicle 4 is to be relocated by automatically traveling the same, the required times between the ports are obviously determined on the basis of the travel speed of automatic traveling.

The following describes an algorithm for determining an SD time with respect to the number of vehicles to be deployed. Obviously, if the number of vehicles equal to the total number of demands in port P is deployed in advance, there is no need for vehicle relocation to that port P. As the number of vehicles to be deployed to port P decreases, the number of vehicles to be relocated increases. Therefore, if the number of deployed vehicles is large and the necessity for relocation is small, the SD time can be set to a small value, tending to shorten the wait time in port P.

However, it is not economical to increase the number of deployed vehicles without limitation. Preferably, the number of deployed vehicles is decreased by positively using relocated vehicles. On the other hand, if the number of deployed vehicles is decreased and the SD time is extremely made long, the wait time tends to become long. In addition, if the SD time gets long, the wait time also gets long but many arrival trips from other ports can be expected, thereby comparatively decreasing the number of relocated vehicles. Consequently, preferably, the number of deployed vehicles, the number of relocated vehicles, and wait time are totally examined to determine the SD time.

Figure 7:
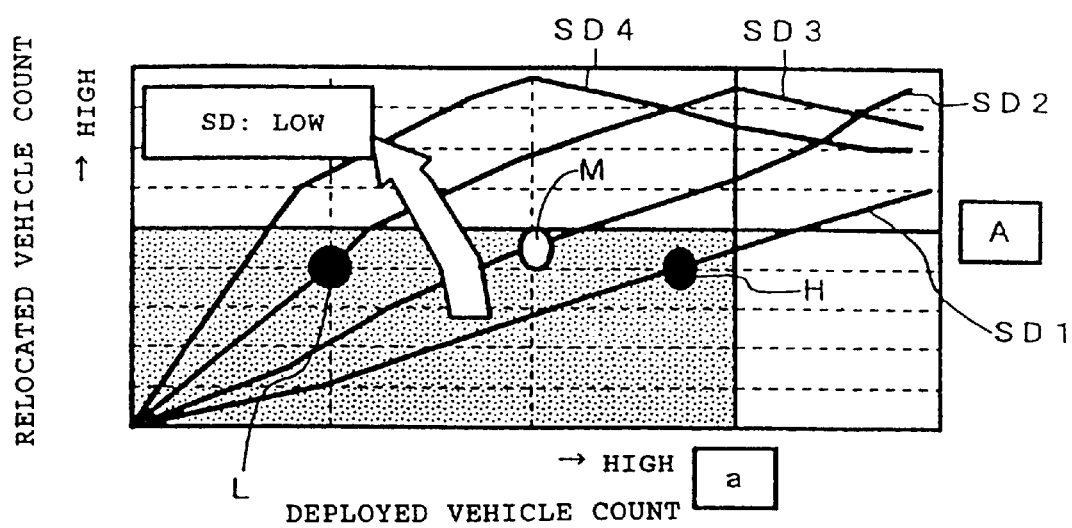
FIG. 7 is a diagram illustrating a relationship between the number of deployed vehicles and the number of relocated vehicles.
Figure 8:
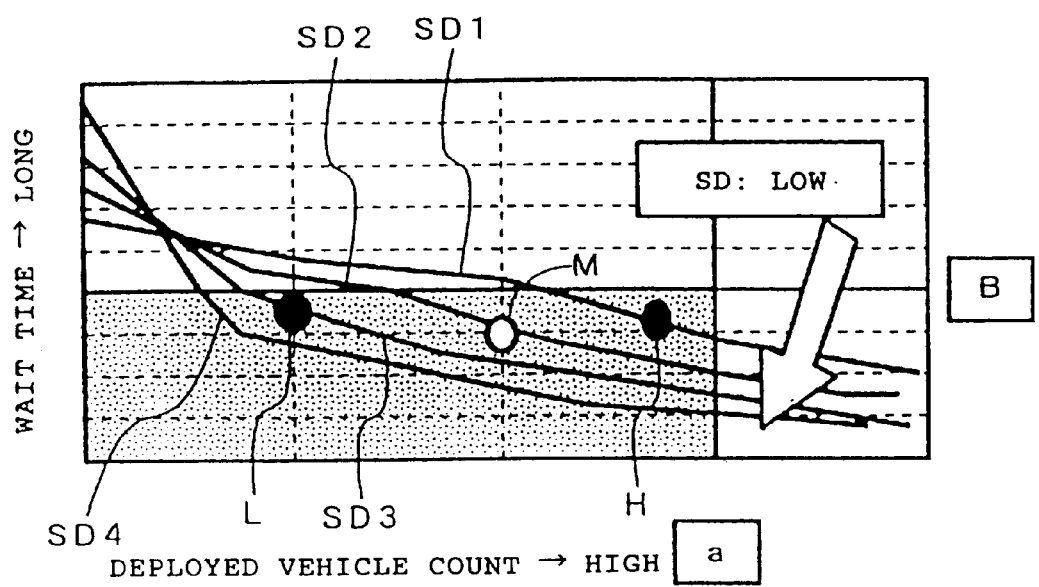
FIG. 8 is a diagram illustrating a relationship between the number of deployed vehicles and an average wait time.

FIG. 7 is a diagram illustrating a relationship between the number of deployed vehicles and the number of relocated vehicles with SD time used as a parameter. FIG. 8 is a diagram illustrating a relationship between the number of deployed vehicles and wait time with SD time used as a parameter. As shown in FIG. 7, if the number of deployed vehicles is less than "a" and the number of relocated vehicles is less than "A", decreasing the number of deployed vehicles decreases the number of relocated vehicles within the same SD time (the SD time being SD1>SD2>SD3>SD4). On the other hand, as shown in FIG. 8, decreasing the number of deployed vehicles increases average wait time. Namely, because the number of deployed vehicles is decreased, the number of relocated vehicles decreases, the wait time increases consequently.

Thus, to prevent the average wait time from exceeding the upper limit time B (B minutes) when the number of deployed vehicles has been decreased, the number of relocated vehicles must be increased. To do so, the SD time must be shortened. In other words, if the number of relocated vehicles is to be decreased, the SD time must be made longer and if the average wait time is to be shortened, the SD time must be shortened.

For example, if points L, M, and H are set, each of these points satisfies both the settings of upper limit B minutes of average wait time and the number of relocated vehicles A. Therefore, which of the number of deployed vehicles, the number of relocated vehicles, and average wait time is to be prioritized can be determined by the necessities of each occasion (for example, business decision).

The following describes a result of an examination performed on the ideal number of deployed vehicles. In order to make a wait time "0" (zero) if there is a difference between the number of demands that actually occur in each port and the number of demands forecast by the forecast occurrence trips of ride demand statistical data, each port, theoretically, may only have one vehicle always every time one demand occurs. On the other hand, if a demand occurs in a port and the number of deployed vehicles that can be relocated from the destination of that demand to the demanding port is deployed in advance, these two ports always have vehicles after the movement of relocated vehicles between the ports. Consequently, the number of deployed vehicles in each port becomes as initially set.

Given that the time for moving vehicles port-to-port is constant and when a demand occurred in one of the ports, if relocation is executed from any other port, all ports can have vehicles after the movement time by replenishing by relocation vehicles between the ports in which vehicles come and go as described above. And if the demand occurrence frequency is only once in the above-mentioned movement time between ports, deploying one vehicle in each port in advance can make the wait time "0" (zero) theoretically. Therefore, actually, the number of deployed vehicles may be determined on the basis of how many times the forecast occurrence trips predicted takes place in the entire area as calculated from the total number of forecast occurrence trips per day.

The following describes an example obtained by a simulation executed on the basis of particular values. FIGS. 9(a)–(c) are diagrams illustrating travel times between port P1 through port P5 for identifying the size of an area. FIG. 9(a) indicates a travel time (48 km/hour) at which a human driver drives a vehicle, while FIG. 9(b) indicates a travel time (16 km/hour) at which a vehicle travels in an unattended manner.

Figure 10:
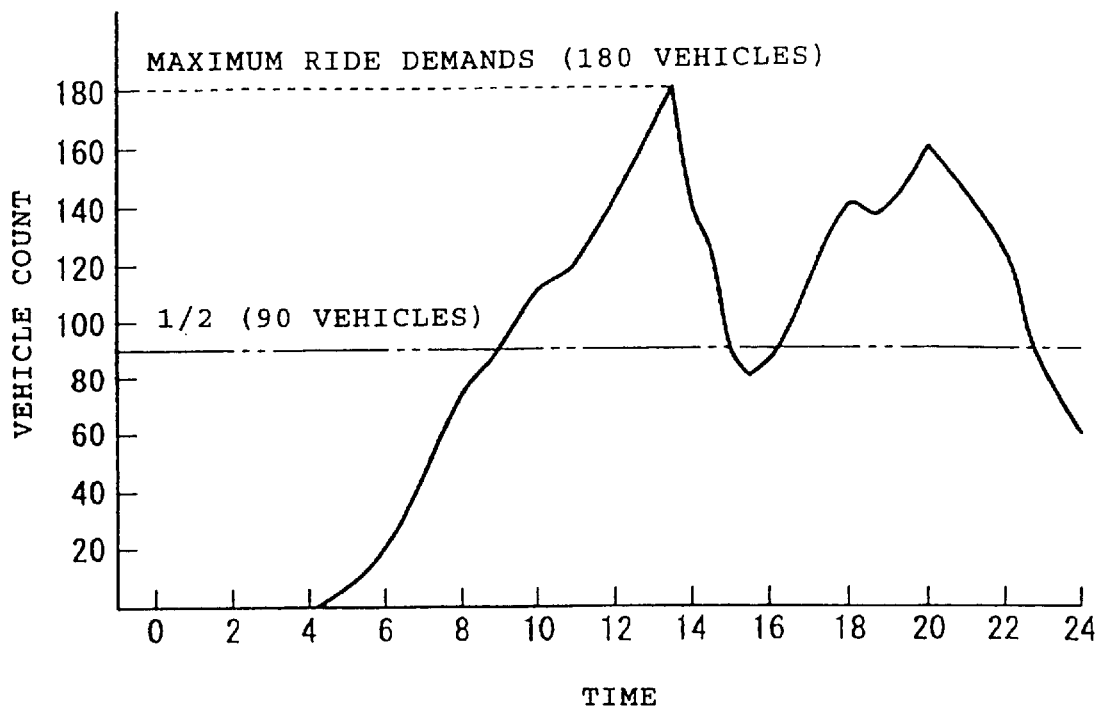
FIG. 10 is a diagram illustrating a transition of a daily ride demand.

FIG. 10 is a diagram illustrating one example of actually measure values of ride demands in one day. As shown, ride demands are not constant throughout a day, namely they fairly fluctuate. In this example, the total number of forecast occurrence trips a day is about 1800.

On the basis of the above-mentioned simulation conditions, the optimum number of deployed vehicles is calculated. The travel time between the ports is based on the travel time in the unattended, automatic travel state. At relocation, the travel speed of unattended travel is lower than that of attended travel, so that the travel time of unattended travel is longer than that of attended travel. Simply averaging the vehicle travel times shown in FIG. 9(b) provides 14.46 minutes (about 15 minutes). If the total forecast occurrence trips in one day is 1,800, then the number of trips in every 15 minutes becomes about 18. This denotes that about 18 trips occur while attended vehicles and unattended vehicles travel for mutual supplement between ports. Therefore, the number of vehicles for the forecast occurrence trips per average travel time of vehicles between ports may only be deployed. To be more specific, deployment of 18 vehicles for each of 5 ports, namely a total of 90 vehicles (in other words, 5% of the total number, which is 1800, of forecast occurrence trips per day) in an area allows relocation from any port in response to occurrence trips. Theoretically, one vehicle always exists in each port when a demand occurs.

Actually, however, there are variations in travel times between ports, the total number of occurrence trips per day varies, and demands may concentratedly occur in a particular time zone. These uncertain elements do not always make the wait time zero. However, as described above, in a system in which vehicle relocation is executed by forecasting occurrence trips and arrival trips from statistical data, the variation in wait time can be decreased if actual demands get out of forecast values.

Figure 11:
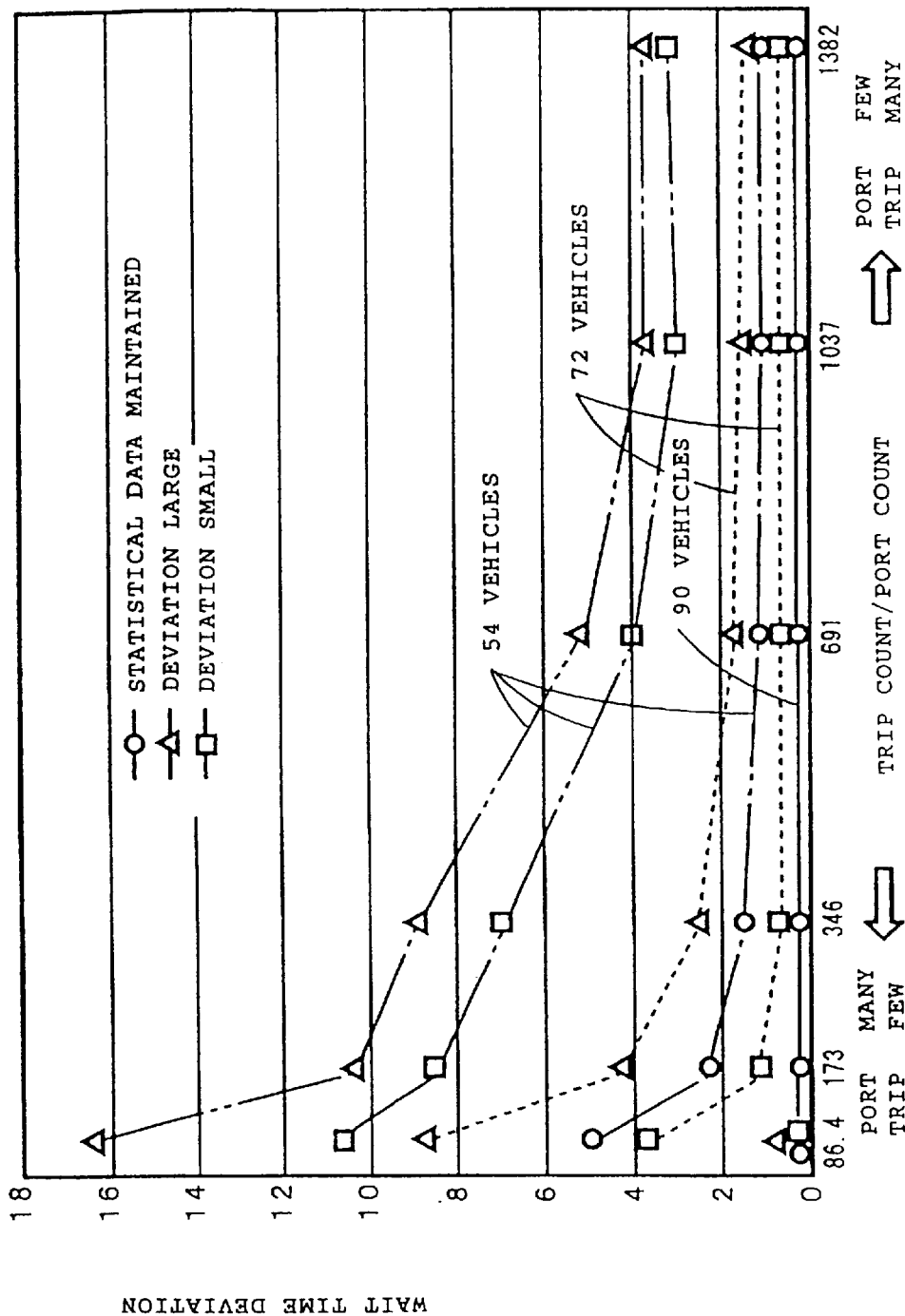
FIG. 11 is another diagram illustrating a deviation in the wait time for each number of deployed vehicles.
Figure 12:
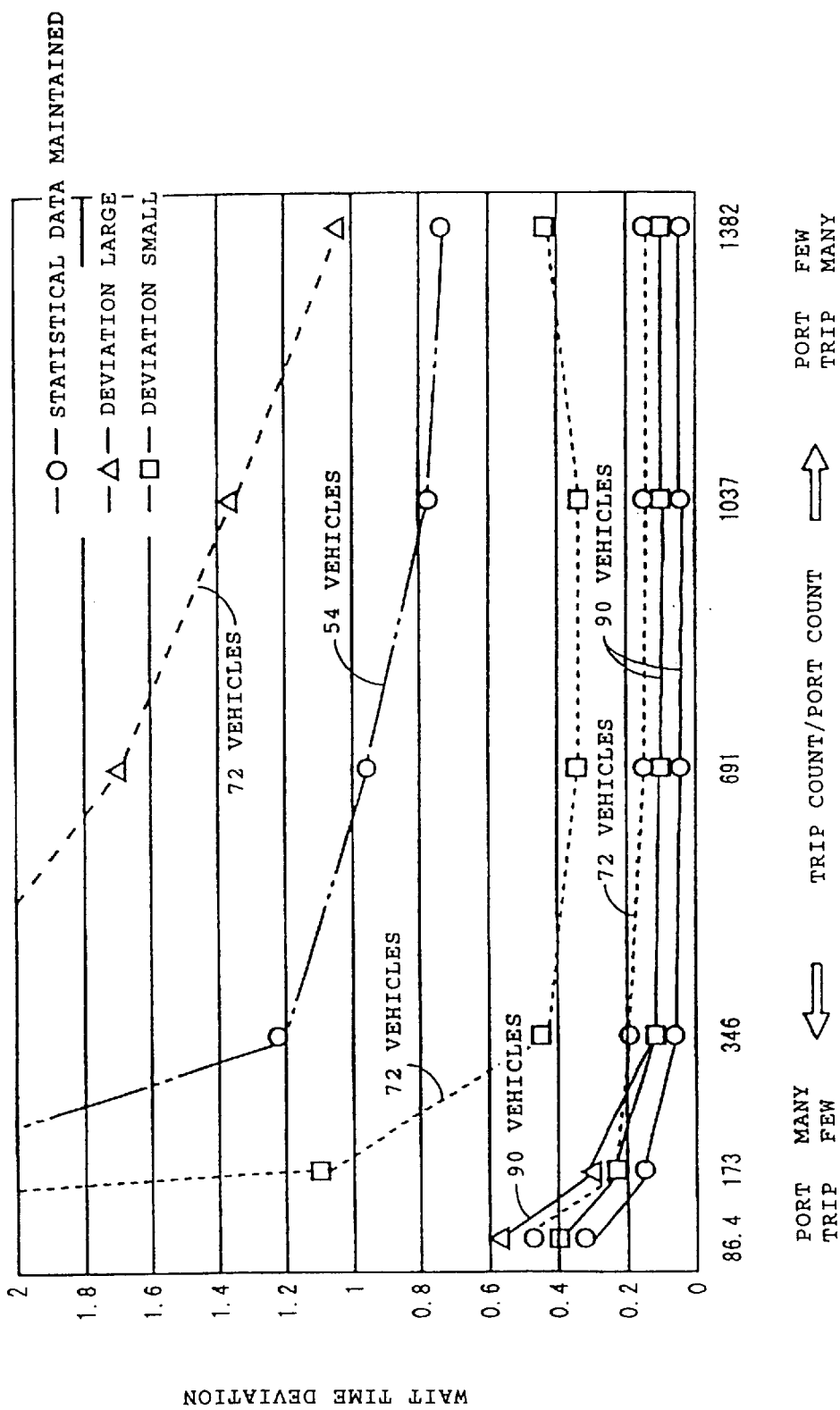
FIG. 12 is a diagram illustrating a deviation in the wait time for each number of deployed vehicles.

FIG. 11 and FIG. 12 are diagrams illustrating the deviations of wait times for each deployed vehicle in an area including a case in which actual demands (occurrence trips) are deviated from the forecast occurrence trips of ride demand statistical data. In each figure, the horizontal axis represents the ratio between the number of trips and the number of ports. It should be noted that FIG. 12 enlarges the wait time deviation shown in FIG. 11.

As shown in these figures, if the number of deployed vehicles is 90, the deviation of actual demands from statistical data, whether it is small or large, results in only a small and stable deviation in wait time, on the other hand, if the number of deployed vehicles is 72 and 54, the deviation of actual demands from statistical data results in a very large deviation in wait time, indicating drastic variations. If the ratio between the number of trips and the number of ports decreases, namely if the number of trips is extremely low as compared with the number of ports, the deviation increases. If the number of ports is less than "about 10" relative to the number of trips of "1800", the deviation in the wait time in the number of trips and the number ports is small. Namely, the wait time becomes hardly affected by the number of trips and the number of ports.

As described above, determining the number of deployed vehicles on the basis of the number of forecast occurrence trips per average travel time between ports provides a vehicle relocation system which is stable to the variations in actual demands.

Further, as shown in FIG. 10, demands do not occur evenly throughout a day (24 hours). There is a time zone (4 hours) in which no demand occurred at all. Therefore, the total number of ride demands of 1800 trips of the total number of forecast occurrence trips per day may be considered as the number of trips for 20 hours. On the basis thereof, the number of forecast occurrence trips per average travel time between ports may be calculated.

In that case, it is preferable to consider that the frequency of occurrence of trips between ports is not even but unbalanced. For example, the number of vehicles traveling between port P1 and port P2 may be larger than the number of vehicles traveling between port P1 and port P5.

The above-mentioned case shown in FIG. 9(c), a ratio to the frequency of occurrence of trips between ports, namely the above-mentioned trips. In this case, it is desired that the average travel time between ports be weighted-averaged instead of the above-mentioned simple averaging. From FIGS. 9(b) and (c), the average travel time becomes 11.91 minutes (about 12 minutes). Therefore, 1800 trips per 20 hours are equivalent to 18 trips in about every 12 minutes, denoting that 90 vehicles may be deployed for 5 ports.

The above-mentioned frequency of occurrence of trips between ports is specific to areas, so that, when an area is set, an occurrence frequency can be forecast and data can be gathered on the basis of the characteristics of the area.

Consequently, it is preferable to consider the travel time between ports and the number of forecast occurrence trips in this travel time on the basis of the above-mentioned frequency of occurrence of trips between ports and a daily demand distribution. Namely, the travel time between ports may be handled not as a simple average value but as a weighted average value with the frequency of occurrence trips considered. In this case, one day may not always be handled as 24 hours.

In the above-mentioned embodiment, a system in which the vehicle 4 is automatically traveled for relocation is assumed. It will be apparent to those skilled in the art that a relocated vehicle may be driven by a human driver and the vehicle 4 may be pulled by a trailer or another vehicle. It will be also apparent to those skilled in the art that the present invention is applicable to not only a vehicle relocation system in which vehicles are driven by users but also a vehicle relocation system in which taxis and limousine taxis are used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle allocation system comprising:

means for detecting a forecast occurrence ride demand count for each port by adding a forecast ride demand count expected to occur within a scheduled time period to a currently owned ride demand count;

means for detecting a forecast occurrence vehicle count for each port by adding an arrival vehicle count expected to arrive within said scheduled time period to a currently owned vehicle count;

means for computing a vehicle excess or shortage count for each port on the basis of said forecast occurrence ride demand count and said forecast occurrence vehicle count; and means for computing an evaluation value of the degree of urgency of the number of vehicles on the basis of said forecast occurrence ride demand count relative to said vehicle excess or shortage count; wherein an excess vehicle is relocated to the port having a lowest evaluation value from another port, wherein said scheduled time period is a search range or time period which spans a prescheduled number of hours or minutes starting from a current time and in which to search for forecasted starting trips, said scheduled time period being set to be greater than a minimum time required for the excess vehicle to be relocated from said another port to the port having said lowest evaluation value, and being set to be less than a predetermined maximum wait time, wherein said evaluation value is calculated by subtracting said forecast occurrence demand from said forecast occurrence vehicle count to obtain a first value, and dividing said first value by a root of said forecast occurrence demand count.

2. The vehicle allocation system as claimed in claim 1, wherein said evaluation value computing means is adapted to compute an evaluation value every time vehicle relocation is executed.

3. The vehicle allocation system as claimed in claim 1, wherein said vehicle relocation is executed sequentially on vehicles of ports in the decreasing order of the evaluation values thereof.

4. The vehicle allocation system as claimed in claim 1, wherein said vehicle relocation is executed sequentially on vehicles of ports in the increasing order of distances therefrom to the port having a smallest evaluation value.

5. A method using computing means of allocating vehicles, comprising the steps of:

determining a forecast occurrence ride demand count for each of a plurality of delimited areas by adding a forecast ride demand count expected to occur within a scheduled time period to a currently owned ride demand count;

determining a forecast occurrence vehicle count for each of said plurality of delimited areas by adding an arrival vehicle count expected to arrive within the scheduled time period to a currently owned vehicle count;

determining an evaluation value based upon said forecast occurrence ride demand and said forecast occurrence vehicle count for each of said plurality of delimited areas;

arranging said evaluation value for each of said plurality of delimited areas in increasing order;

determining an excess or shortage of vehicles for each of said plurality of delimited areas in the order arranged in said arranging step;

calculating the difference of said forecast occurrence vehicle count and said forecast occurrence ride demand count for each of said plurality of delimited areas;

determining if any of said plurality of delimited areas needs relocation of at least one vehicle based upon a polarity of the difference calculated in said calculating step, wherein said scheduled time period is a search range or time period which spans a prescheduled number of hours or minutes starting from a current time and in which to search for forecasted starting trips, said scheduled time period being set to be greater than a minimum time required for an excess vehicle to be relocated from another port to a port having a lowest evaluation value, and being set to be less than a predetermined maximum wait time, wherein the step of determining said evaluation value determines said value by calculating a difference of said forecast occurrence vehicle count and said forecast occurrence demand, and dividing the difference by the root of said forecast demand count, wherein said determining, arranging and calculating steps use said computing means.

6. The method of claim 5, further comprising the steps of:

terminating vehicle allocation control if said polarity is positive for each of said plurality of delimited areas; and relocating at least one vehicle to at least one of said plurality of delimited areas if at least one of said plurality of delimited areas has a negative polarity.

7. The method of claim 6, further comprising the step of:

updating said evaluation value once at least one vehicle is relocated by said relocating step.

8. The method of claim 6, wherein the step of relocating, if one of said delimited areas has a negative polarity, relocates a vehicle from a delimited area having an excess of vehicles, and in closest proximity, to said delimited area having negative polarity.

9. The vehicle allocation system as claimed in claim 1, wherein said root is a square root.

10. The vehicle allocation system as claimed in claim 2, wherein said evaluation value is calculated by subtracting said forecast occurrence demand from said forecast occurrence vehicle count to obtain a first value, and dividing said first value by a root of said forecast occurrence demand count.

11. The vehicle allocation system as claimed in claim 10, wherein said root is a square root.

12. The vehicle allocation system as claimed in claim 3, wherein said evaluation value is calculated by subtracting said forecast occurrence demand from said forecast occurrence vehicle count to obtain a first value, and dividing said first value by a root of said forecast occurrence demand count.

13. The vehicle allocation system as claimed in claim 12, wherein said root is a square root.

14. The vehicle allocation system as claimed in claim 4, wherein said evaluation value is calculated by subtracting said forecast occurrence demand from said forecast occurrence vehicle count to obtain a first value, and dividing said first value by a root of said forecast occurrence demand count.

15. The vehicle allocation system as claimed in claim 14, wherein said root is a square root.

16. The method of claim 5, wherein the step of determining said evaluation value determines said value by calculating a difference of said forecast occurrence vehicle count and said forecast occurrence demand, and dividing the difference by a root of said forecast demand count.

* * * * *